United States Patent
Funaoka et al.

(10) Patent No.: US 7,479,243 B2
(45) Date of Patent: Jan. 20, 2009

(54) MICROPOROUS POLYOLEFIN MEMBRANE, AND METHOD OF PRODUCING THE SAME

(75) Inventors: Hidehiko Funaoka, Tokyo (JP); Kotaro Takita, Yokohama (JP); Norimitsu Kaimai, Kanagawa (JP); Shigeaki Kobayashi, Kanagawa (JP); Koichi Kono, Saitama (JP)

(73) Assignee: Tonen Chemical Corporation, Tokyo (JP)

( * ) Notice: Subject to any disclaimer, the term of this patent is extended or adjusted under 35 U.S.C. 154(b) by 476 days.

(21) Appl. No.: 10/649,732

(22) Filed: Aug. 28, 2003

(65) Prior Publication Data

US 2005/0098913 A1    May 12, 2005

Related U.S. Application Data

(62) Division of application No. 09/806,308, filed as application No. PCT/JP99/05345 on Sep. 29, 1999, now Pat. No. 6,666,969.

(30) Foreign Application Priority Data

Oct. 1, 1998 (JP) ............................ 10-294641
Oct. 1, 1998 (JP) ............................ 10-294642

(51) Int. Cl.
*B29C 47/78* (2006.01)
*B01D 71/26* (2006.01)

(52) U.S. Cl. ............... 264/41; 210/500.21; 210/500.27; 264/210.4; 264/211.19; 264/288.8; 264/344

(58) Field of Classification Search .................. 254/41; 264/288.4, 288.8, 344, 41, 211.13, 211.19, 264/235.8, 210.4, 290.2; 210/500.21, 500.27, 210/500.23

See application file for complete search history.

(56) References Cited

U.S. PATENT DOCUMENTS

| | | | | |
|---|---|---|---|---|
| 4,174,426 A | * | 11/1979 | Asami et al. .................. 521/27 |
| 4,243,701 A | * | 1/1981 | Riley et al. .................. 427/244 |
| 4,448,687 A | * | 5/1984 | Wang .................... 210/500.23 |
| 4,545,950 A | * | 10/1985 | Motooka et al. ......... 264/210.6 |
| 4,588,653 A | * | 5/1986 | Wray .......................... 428/600 |
| 4,620,955 A | * | 11/1986 | Kono et al. .................. 264/41 |
| 4,741,829 A | | 5/1988 | Takemura et al. |
| 4,789,609 A | * | 12/1988 | Ambrose-Ritchey et al. ..... 429/144 |
| 4,840,733 A | | 6/1989 | Sasaki et al. |

(Continued)

FOREIGN PATENT DOCUMENTS

EP    0 476 198 A1    3/1992

(Continued)

*Primary Examiner*—Mathieu D. Vargot
(74) *Attorney, Agent, or Firm*—Kratz, Quintos & Hanson, LLP (57) ABSTRACT

The present invention provides a microporous polyolefin membrane of high permeability and novel structure, and also provides a method of producing the same, wherein its average pore size is gradually decreases from at least one membrane surface towards its center. The method of producing the microporous polyolefin membrane comprises the steps of extruding the solution, composed of 10 to 50 weight % of (A) a polyolefin having a weight-average molecular weight of $5 \times 10^5$ or more or (B) a composition containing this polyolefin and 50 to 90 weight % of a solvent, into a gel-like formed article and removing the solvent therefrom, wherein a treatment step with a hot solvent is incorporated.

2 Claims, 2 Drawing Sheets

1 Surface of the microporous membrane
2' Layer of larger pores
3 Layer of smaller pores
2 Layer of larger pores
1 Surface of the microporous membrane

U.S. PATENT DOCUMENTS

| | | | |
|---|---|---|---|
| 4,873,034 A * | 10/1989 | Kono et al. | 264/41 |
| 5,051,183 A * | 9/1991 | Takita et al. | 210/500.36 |
| 5,055,248 A * | 10/1991 | Motooka et al. | 264/210.3 |
| 5,112,487 A * | 5/1992 | Himeshima et al. | 210/490 |
| 5,683,634 A | 11/1997 | Fujii et al. | |
| 5,786,396 A * | 7/1998 | Takita et al. | 521/64 |
| 5,830,554 A * | 11/1998 | Kaimai et al. | 428/131 |
| 5,853,633 A * | 12/1998 | Kono et al. | 264/54 |
| 5,882,518 A | 3/1999 | Yagi et al. | |
| 5,922,492 A * | 7/1999 | Takita et al. | 429/249 |
| 6,017,455 A * | 1/2000 | Shimoda et al. | 210/500.23 |
| 6,048,607 A | 4/2000 | Hashimoto et al. | |
| 6,153,133 A | 11/2000 | Kaimai et al. | |
| 6,245,272 B1 | 6/2001 | Takita et al. | |
| 6,566,012 B1 | 5/2003 | Takita et al. | |

FOREIGN PATENT DOCUMENTS

| | | |
|---|---|---|
| EP | 0 481 517 A1 | 4/1992 |
| JP | 49-113859 | 10/1974 |
| JP | 61 021702 | 1/1986 |
| JP | 6-234875 | 8/1994 |
| JP | 10 151330 | 6/1998 |

* cited by examiner

MICROPOROUS POLYOLEFIN MEMBRANE, AND METHOD OF PRODUCING THE SAME

This application is a division of Ser. No. 09/806,308, filed Aug. 20, 2001, now U.S. Pat. No. 6,666,969, which is a 371 of PCT/JP99/05345, filed Sep. 29, 1999.

BACKGROUND OF THE INVENTION

1. Field of the Invention

This invention relates to a microporous membrane composed of an ultra-high-molecular-weight polyolefin, more particularly to a microporous polyolefin membrane of high permeability, and a method of producing the same.

2. Description of the Prior Art

Microporous membranes are widely used in various applications such as battery separators (in particular, lithium ion type primary and secondary batteries), large-sized battery separators or electrolytic capacitor separators for electric cars or the like, various types of separation membranes (e.g., for water treatment, ultrafiltration, microfiltration and reverse osmosis), various types of filters, moisture-permeable and waterproof clothes and the base materials thereof, etc. Microporous polyolefin membranes are produced, e.g., by an extraction process comprising the steps of mixing a polyolefin with an organic solvent and inorganic powder such as finely powdered silica, melting and molding the mixture, and extracting the organic solvent and inorganic powder. This method needs a process of extracting the inorganic powder, and permeability of the membrane produced depends largely on particle size of the inorganic powder used and is difficult to control.

Recently, various processes have been proposed to produce high-strength, microporous membranes which contain an ultra-high-molecular-weight polyolefin. For example,. Japanese Patent Laid-Open Nos. 60-242035, 61-195132, 61-195133, 63-39602, 63-273651, 3-64334, and 3-105851 disclose processes to produce microporous membranes by forming a gel-like sheet from a heated solution of a polyolefin composition containing an ultra-high-molecular-weight polyolefin dissolved in a solvent, stretching it while heating, and removing the solvent by extraction. These processes give the microporous polyolefin membranes characterized by a narrow pore size distribution and small pore size, which are used for battery separators or the like.

Recently, lithium ion type secondary batteries are required to have a property of high energy density, and microporous membranes of polyolefin having a shut-down function are widely used for the battery separators, to meet the increasing demands for the batteries. However, for the special battery purposes, e.g., those requiring high output at low temperature, a microporous polyolefin membrane of small pore size may cause problems, e.g., increased inner resistance of the battery. Therefore, the microporous polyolefin membranes high in safety and ion permeability are in demand. It is also necessary to easily control size of the pores, both for those in the vicinity of the membrane surface and its inside.

SUMMARY OF THE INVENTION

It is an object of the present invention to provide a microporous polyolefin membrane of high permeability and novel structure. It is another object of the present invention to provide a method of producing the same.

The inventors of the present invention have found, after having extensively studied to solve the above problems, that a microporous polyolefin membrane having a pore size distribution in the thickness direction can be produced by treating, with a hot solvent, the gel-like formed article or stretched product thereof obtained by extruding a solution of ultra-high-molecular-weight polyolefin or composition containing an ultra-high-molecular-weight polyolefin dissolved in a solvent, or the microporous membrane obtained by removing the solvent from the gel-like formed article or stretched product thereof, to reach the present invention.

The present invention provides a microporous polyolefin membrane, composed of (A) a polyolefin having a weight-average molecular weight of $5\times10^5$ or more or (B) a composition containing this polyolefin, wherein average pore size is gradually decreases from at least one membrane surface towards its center. The present invention also provides a method of producing the same microporous polyolefin membrane, comprising the steps of extruding the solution, composed of 10 to 50 weight % of (A) a polyolefin having a weight-average molecular weight of $5\times10^5$ or more or (B) a composition containing this polyolefin and 50 to 90 weight % of a solvent, into a gel-like formed article and removing the solvent therefrom, wherein a treatment step with a hot solvent is incorporated.

DETAILED DESCRIPTION OF THE INVENTION

1. Polyolefin

The polyolefin (A) for the microporous polyolefin membrane of the present invention has a weight-average molecular weight of $5\times10^5$ or more, preferably in a range from $1\times10^6$ to $15\times10^6$. When the weight-average molecular weight is less than $5\times10^5$, the membrane tends to suffer deteriorated strength.

The polyolefin composition (B) contains at least 1 weight % of an ultra-high-molecular-weight polyolefin having a weight-average molecular weight of $5\times10^5$ or more, preferably $7\times10^5$ or more, more preferably in a range from $1\times10^6$ to $15\times10^6$. When the ultra-high-molecular-weight polyolefin content is less than 1 weight %, the microporous polyolefin membrane of high strength may not be obtained, because of lack of the molecular chains of the ultra-high-molecular-weight polyolefin entwining with each other. Other polyolefins than the ultra-high-molecular-weight polyolefin in the polyolefin composition, i.e., those having a weight-average molecular weight of less than $5\times10^5$, preferably have a lower weight-average molecular weight limit of $1\times10^4$. When a polyolefin having a weight-average molecular weight of less than $1\times10^4$ is used, rupture is likely to take place in the membrane, failing to provide a desired microporous membrane.

When a mixture of (B-1) an ultra-high-molecular-weight polyolefin having a weight-average molecular weight of $5\times10^5$ or more and (B-2) a polyolefin having a weight-average molecular weight of less than $5\times10^5$ is used, the (B-2)/(B-1) weight ratio of the composition is 0.2 to 20, preferably 0.5 to 10. When the (B-2)/(B-1) weight ratio is below 0.2, the gel-like formed article produced tends to shrink in the thickness direction and decrease in permeability, and viscosity of the solution increases to deteriorate its molding processability. When the (B-2)/(B-1) weight ratio is above 20, on the other hand, concentration of the ultra-high-molecular-weight polyolefin is excessively low, to-result in densified gel structure and lowered permeability of the microporous membrane produced.

Examples of the above polyolefins include crystalline homopolymers, two-stage polymers or copolymers of ethylene, propylene, 1-butene, 4-methyl-pentene-1 or 1-hexene, or blends thereof. Preferable among them are polypropylene, polyethylene and compositions thereof.

The above polyolefin or polyolefin composition has a molecular weight distribution (weight-average molecular weight/number-average molecular weight) of 300 or less, preferably 5 to 50. The molecular weight distribution of above 300 is undesirable, because the membrane comprising such a composition may suffer breakdown by the lower molecular weight components to lose its strength as a whole. When the polyolefin composition is used, it can be obtained by mixing an ultra-high-molecular-weight polyolefin having a weight-average molecular weight of $5 \times 10^5$ or more and a polyolefin having a weight-average molecular weight of less than $5 \times 10^5$ with each other in an adequate ratio to secure the molecular weight distribution to fall in the above range. The polyolefin composition may be the one produced by the multi-stage polymerization or containing two or more types of polyolefins, so long as it has a molecular weight and molecular weight distribution falling in the above ranges.

When the porous polyolefin membrane of the present invention is used for a lithium battery separator or the like, the polyolefin therefor may be incorporated with a polymer capable of giving a shut-down property at low temperature. These polymers include low-density polyethylene, low-molecular-weight polyethylene and linear ethylene-α-olefin copolymer.

The low-density polyethylenes useful for the present invention include branched polyethylene (LDPE) produced by the high pressure process, and linear low-density polyethylene (LLDPE) produced by the low pressure process. The LDPE normally has a density of around 0.91 to 0.93 g/cm$^3$, and melt index (MI at 190° C. and 2.16 kg load) of 0.1 to 20 g/10 minutes, preferably 0.5 to 10 g/10 minutes. The LLDPE normally has a density of around 0.91 to 0.93 g/cm$^3$, and melt index (MI at 190° C. and 2.16 kg load) of 0.1 to 25 g/10 minutes, preferably 0.5 to 10 g/10 minutes. The preferable composition, when the low-density polyethylene is included, is composed of 1 to 69 weight % of an ultra-high-molecular-weight polyethylene having a weight-average molecular weight of $7 \times 10^5$, 98 to 1 weight % of the high-density polyethylene, and 1 to 30 weight % of the low-density polyethylene.

The low-molecular-weight polyethylene useful for the present invention is a polyethylene of low degree of polymerization, having a molecular weight of 1,000 to 4,000 and melting point of 80 to 130° C., i.e., DSC peak temperature determined in accordance with JIS K7121, and preferably of polyethylene wax having a density of 0.92 to 0.97 g/cm3. The low-molecular-weight polyethylene can be incorporated with (A) a polyolefin or (B) a polyolefin composition at 1 weight % or more, preferably 10 to 70 weight %.

The linear ethylene-α-olefin copolymer useful for the present invention as the one capable of giving a shut-down property at low temperature include a linear ethylene-α-olefin copolymer produced in the presence of a single-site catalyst, e.g., metallocene catalyst, e.g., ethylene-butene-1 copolymer, ethylene-hexene-1 copolymer or ethylene-octene-1 copolymer. The ethylene-α-olefin copolymer has a melting point (DSC peak temperature determined in accordance with JIS K7121) of 95 to 125° C., preferably 100 to 120° C. When a copolymer having a melting point of less than 95° C. is used, the battery produced will have characteristics significantly deteriorated at high temperature. Use of a copolymer having a melting point more than 125° C. is also undesirable, because the shut-down property may not be exhibited at an adequate temperature level. The ethylene-α-olefin copolymer has a weight-average molecular weight/number-average molecular weight ratio (Mw/Mn ratio, Q value) of 1.5 to 3.0, preferably 1.5 to 2.5. When incorporated with the ethylene-α-olefin copolymer, the polyethylene or its composition can give the microporous polyethylene membrane for a lithium battery separator or the like, which can be shut down at low temperature when battery inside temperature increases as a result of electrode short circuit. Moreover, it can drastically improve dependence of membrane resistance on temperature when the separator is shut down, and allow the shut-down temperature to be freely controlled. The polyethylene or its composition is incorporated with the ethylene-α-olefin copolymer at 2 to 80 weight %, preferably 5 to 50 weight %. At below 2 weight %, the rapid shut-down effect may not be expected at low temperature, and at above 80 weight %, the microporous polyethylene membrane will significantly lose strength.

When a polyethylene is used as the polyolefin for the present invention, it may be incorporated with polypropylene to provide microscopic roughness on the microporous membrane surface, in order to help the membrane hold the electrolytic solution. The polypropylene compounds useful for the present invention include homopolypropylene having a weight-average molecular weight of $1.0 \times 10^4$ or more, preferably in a range from $3.0 \times 10^4$ to $1.0 \times 10^6$, and ethylene/propylene random copolymer and ethylene/propylene block copolymer containing ethylene at 1.0 weight %. When polypropylene having a weight-average molecular weight of less than $1.0 \times 10^4$ is used, the microporous polyolefin membrane produced will be difficult to bore. When the ethylene content exceeds 1.0 weight %, the polyolefin has deteriorated crystallinity, making the microporous polyolefin membrane it gives difficult to bore.

The polypropylene content is 5 to 30 weight %, based on the polyolefin or its composition, preferably 5 to 25 weight %. At below 5 weight %, it cannot form a number of evenly dispersed irregularities, making little contribution to the improved electrolyte-holding effect. At above 30 weight %, on the other hand, the microporous polyolefin membrane produced will have significantly deteriorated strength. At a still higher content, it will be difficult to form the sheet, because of the phase separation between the polyethylene and polypropylene taking place during the sheet-forming step.

Incidentally, the polyolefin composition containing the ultra-high-molecular-weight polyolefin component may be incorporated with various additives such as antioxidants, ultraviolet absorbers, antiblocking agents, pigments, dyes, inorganic fillers, etc., if required, within limits not harmful to the object of the present invention.

2. Microporous Polyolefin Membrane

Figure 1:
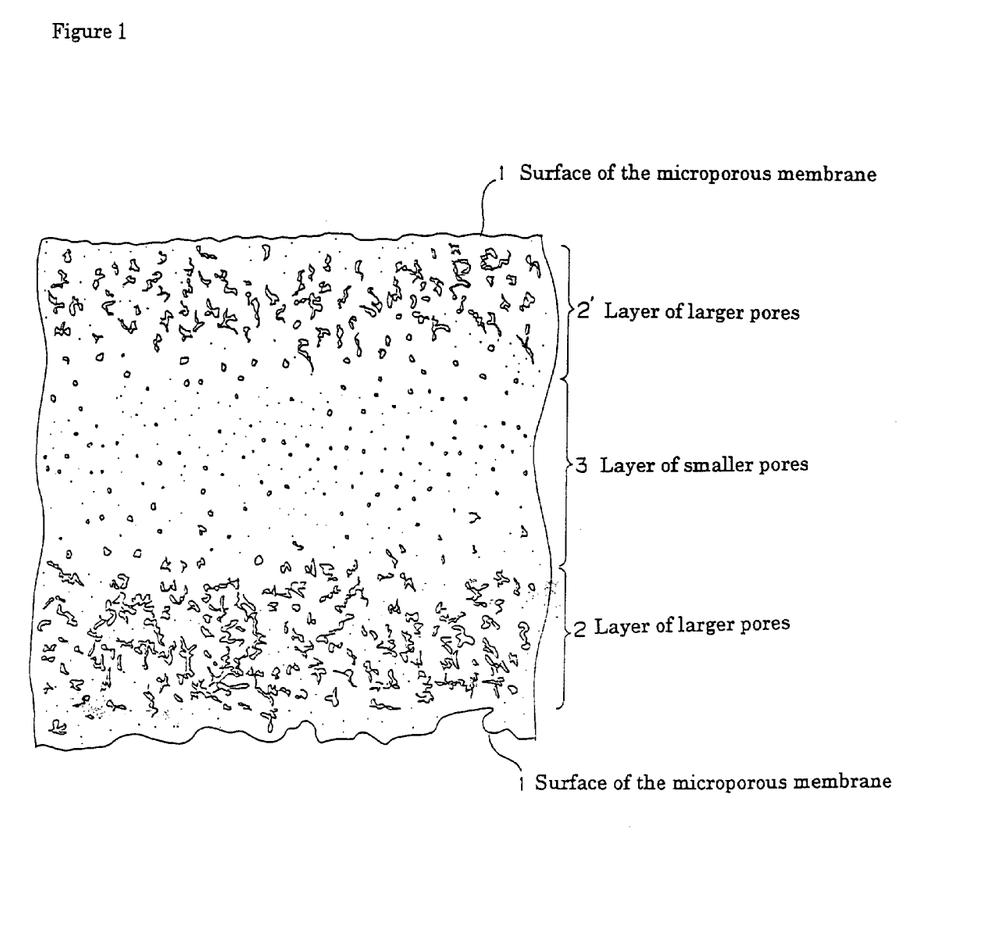
FIG. 1 presents the transmission electron microgram (magnification: 2,500) which shows the sectional structure of the microporous polyolefin membrane.

The microporous polyolefin membrane of the present invention has micropores whose average size is gradually decreases from at least one membrane surface towards its center, and has high permeability. For example, referring to FIG. 1, which presents the transmission electron microgram (magnification: 2,500) showing the sectional structure of the microporous polyolefin membrane, average size of the pores is larger in the vicinity of the membrane surface than in the vicinity of the center.

Each of the through-holes in the microporous polyolefin membrane of the present invention may have a large opening and smaller size at the center, or have a large opening and tapers off towards the opposite side.

The microporous polyolefin membrane of the present invention has a novel structure with a layer of smaller pores to sustain strength of the membrane, and larger openings in the vicinity of the surface to secure high permeability.

When the membrane has a thickness of (d), the average pore size (a) in the area from the surface to a depth of d/16 is 0.05 to 50 μm, preferably 1 to 30 μm, and the average pore size (b) in the other area is 0.01 to 30 μm, preferably 0.03 to 2 μm, where the relationship (b)<(a) should hold.

The microporous polyolefin membrane of the present invention, characterized by the above structure, has an overall porosity of 35 to 95%, preferably 45 to 80%, and permeability of 5 to 500 sec/100 cc, preferably 5 to 250 sec/100 cc.

3. Method of Producing the Microporous Polyolefin Membrane

The microporous polyolefin membrane of the present invention can be obtained by the method comprising the steps of extruding the solution of the above-described polyolefin or polyolefin composition dissolved in a solvent into a gel-like formed article, removing the solvent, with or without stretching, and drying the formed article, wherein a treatment step with a hot solvent is incorporated, as described earlier.

(1) Method of Producing the Microporous Membrane

In the method of the present invention as the basis for producing a microporous membrane, a solution is prepared by dissolving the above polyolefin or its composition in a solvent while heating. Examples of the solvents include aliphatic or cyclic hydrocarbons such as nonane, decane, decalin, p-xylene, undecane, dodecane, paraffin oils, etc., and fractions of mineral oils having boiling points substantially equal to those of the above hydrocarbons. These solvents have a viscosity of 30 to 500 cSt at 25° C., preferably 50 to 200 cSt. Uneven extrusion results when viscosity is below 30 cSt at 25° C., making it difficult to knead the solution, whereas the solvent is difficult to remove in the post treatment when viscosity is above 500 cSt.

Dissolution of the polyolefin or its composition while heating is carried out by stirring its solution at a temperature at which it is completely dissolved in the solvent, or uniformly mixing it and solvent with each other in an extruder. When the polyolefin or its composition is to be dissolved in the solvent with stirring, the dissolving temperature varies depending on the types of polymers and solvents used. It is in the range of 140 to 250° C. in the case of polyethylene composition. It is preferable to effect the dissolution in an extruder, when a high-concentration solution of the polyolefin or its composition is used to produce a microporous membrane.

When the dissolution is to be effected in an extruder, the polyolefin or its composition is first charged in the extruder to be molten, at a temperature preferably 30 to 100° C. above melting point of the polyolefin, although varying depending on type of the polyolefin used. The melting point is described later. For example, it is 160 to 230° C., preferably 170 to 200° C., in the case of polyethylene, and 190 to 270° C., preferably 190 to 250° C., in the case of polypropylene. Then; a liquid solvent is added to the polyolefin or its composition in the middle of the extruder.

The concentration of the polyolefin or its composition is 10 to 50 weight % based on the total solution, preferably 10 to 30 weight %, or conversely the concentration of the solvent is 90 to 50 weight %, preferably 90 to 70 weight %. When the polyolefin or its composition concentration is less than 10 weight % (or the solvent concentration is more than 90 weight %), swelling and neck-in are likely to take place at the exit of a die in the process of forming sheets. Accordingly, it is difficult to keep good molding processability and self-supporting characteristics of the sheet produced. On the other hand, when the polyolefin or its composition concentration is more than 50 weight % (or the solvent concentration is less than 50 weight %), the sheet produced will suffer various problems, such as excessive shrinkage in the thickness direction, lowered porosity, and deteriorated molding processability. Accordingly, it is difficult to produce the microporous membrane having large pores. It is possible to control permeability of the membrane by changing the polyolefin or its composition concentration in the above range.

Next, the heated solution of the molten and kneaded polyolefin or its composition is extruded through a die or the like, in such a way to secure the final membrane thickness of 5 to 250 μm, either directly or via another extruder.

Usually used as a die is a sheet die having a rectangular orifice, but a double-pipe hollow die, an inflation die, etc. may be used. When the sheet die is used, a die gap is usually 0.1 to 5 mm, and heated at 140 to 250° C. in the extrusion process. In this case, a casting roll speed is usually 20-30 cm/minute to 15 m/minute.

The solution extruded through the die is formed into a gel-like article by quenching. It is cooled to 90° C. or below, preferably to 80 to 30° C., at a speed of at least 50° C./minute, by cooling the die or the gel-like sheet. As a method of cooling the gel-like sheet, direct contact with cooling air, cooling water or other cooling media, contact with a roll cooled by a coolant, etc. may be employed. Contact with a cooled roll is a preferable method.

The gel-like article produced will have a rough higher-order structure, and the pseudo-cell units that constitute the structure also become rough at an excessively low cooling speed, whereas dense cellar units result at a sufficiently high cooling speed. Decreasing cooling speed to below 50° C./minute makes the gel structure close to that comprising individual bubbles, and increases its crystallization degree, making it difficult to remove the solvent.

The cooling roll is preferably kept at 30° C. to polyolefin crystallization temperature, preferably 40 to 90° C. When cooling roll temperature is excessively high, the gel-like sheet will be cooled slowly to sufficiently increase thickness of the walls defining the lamella structure of the polyolefin, of which the gel structure is composed, tending to make the micropores into the individual bubbles. As a result, the solvent becomes difficult to remove, and membrane permeability decreases. When it is excessively low, on the other hand, the gel-like sheet is quenched excessively rapidly. As a result, the gel structure is excessively densified, decreasing pore size and permeability. The gel-like sheet is withdrawn at 1 to 20 m/minute, preferably 3 to 10 m/minute. Low withdrawal rate is preferable, because neck-in tends to take place on the sheet, making it excessively stretchable.

The gel-like article is then stretched, as required, by an ordinary method, such as a tenter, roll, calender method or a combination thereof at a given stretching ratio. It may be monoaxial or biaxial. In the case of biaxial stretching, the gel-like article may be stretched in the longitudinal and transverse directions simultaneously or sequentially. The simultaneous stretching is more preferable.

The stretching temperature should be in a range from the polyolefin crystal dispersion temperature to 10° C. above the crystal melting point, preferably in a range from the crystal dispersion temperature to the crystal melting point. For a polyethylene composition containing an ultra-high-molecular-weight polyethylene, for example, it is preferably in a range from 90 to 140° C., more preferably from 100 to 130° C. If the stretching temperature is higher than the melting point plus 10° C., the molecular orientation by stretching does not take place because the resin melts. If the stretching temperature is lower than the crystal dispersion temperature, on the other hand, the resin is softened insufficiently, with the result that the membrane tends to break and stretching ratio cannot be well controlled.

The crystal dispersion temperature is the temperature level determined by measuring the temperature characteristics of the dynamic viscoelasticity, in accordance with ASTM D4065, and melting point is the peak temperature observed by a DSC., in accordance with JIS K7211 (the same in the following pages).

The stretching ratio is not limited, but preferably 2 to 400 times as areal stretching ratio, more preferably 15 to 400.

The article, stretched or not stretched, is then washed with a solvent to remove the residual solvent. Solvents used for this solvent-removing treatment may be volatile ones, including hydrocarbons such as pentane, hexane and heptane; chlorinated hydrocarbons such as methylene chloride and carbon tetrachloride; fluorinated hydrocarbons such as trifluoroethane; and ethers such as diethyl ether and dioxane. These volatile solvents may be used individually or in combination, and their selection depends on the types of the nonvolatile solvents used to dissolve the polyolefin composition. Washing methods with the solvents include an extraction method with solvent, a method of spraying solvent or a combination thereof.

The washing of the thermally set article with a solvent should be performed to such an extent that the content of the residual solvent is less than 1 weight %. The article is finally dried to remove the washing solvent by a heating method, an air-drying method, etc.

(2) Step of Treatment with Hot Solvent

The microporous polyolefin membrane of the present invention having a novel structure can be produced by incorporating a step of treatment with hot solvent.

This step of treatment with hot solvent may be incorporated before or after the above-described solvent removal step. The formed article may be treated either directly or indirectly, wherein it is directly brought into contact with the hot solvent in the former, and heated after being brought into contact with the solvent in the latter (they are hereinafter referred to as the direct and indirect method, respectively). In other words, any method can be adopted, so long as the formed article can be brought into contact with the hot solvent in any stage.

Those falling into the category of direct method include dipping the article in the hot solvent, spraying the hot solvent onto the article, and spreading the hot solvent over the article. Of these, the dipping method is more preferable because it can treat the article more uniformly. Those falling into the category of indirect method include dipping the article in the solvent, spraying the solvent onto the article, and spreading the solvent over the article, the article thus treated being further treated with the hot solvent by hot rolling, heating in an oven or dipping in the hot solvent.

The solvent temperature is from the crystal dispersion temperature to melting point plus 10° C. of the (A) polyolefin or (B) polyolefin composition or more, but at melting point of the (A) polyolefin or (B) polyolefin composition. When the polyolefin is a polyethylene, it is preferably 110 to 130° C., more preferably 115 to 125° C. At below the crystal dispersion temperature, the effects of treatment with the hot solvent and improving permeability are little expected. At above the melting point plus 10° C., on the other hand, the undesirable effects may result, to cause rapid loss of strength or breaking of the microporous membrane. The treatment time is preferably 0.1 seconds to 10 minutes, more preferably 5 seconds to 1 minute. When treatment time is less than 0.1 seconds, the effects of treatment with the hot solvent and improving permeability are little expected. When it exceeds 10 minutes, on the other hand, the undesirable effects may result, to cause rapid loss of strength or breaking of the microporous membrane.

The solvent useful for the above treatment may be the same as or different from the one used for producing the above-described polyolefin solution. One of the most desirable solvents is liquid paraffin.

The microporous polyolefin membrane of the present invention, produced by the above-described procedure to have the above-described structure, is a highly permeable membrane, having a permeability of 5 to 500 sec/100 cc, preferably 5 to 250 sec/100 cc, overall porosity of 35 to 95%, preferably 45 to 80%, and average pore size of 0.05 to 50 μm at least in the vicinity of one of the surfaces.

Another advantage of the present invention is controllability of pore size and porosity of the membrane only by changing temperature and time of the hot solvent treatment step, without changing the overall process (refer to EXAMPLE 5, described later).

The resulting microporous polyolefin membrane is, if necessary, subjected to a hydrophilic treatment by plasma irradiation, impregnation with a surface active agent, surface grafting, etc.

EXAMPLES

The present invention is described in more detail by the following preferred embodiments, which by no means limit the present invention. The properties cited in the preferred embodiments were determined by the following test methods:

(1) Weight-average molecular weight and molecular weight distribution: Determined by gel permeation chromatography (GPC), with GPC analyzer (Waters), column (Tosoh's GMH-6) and o-dichlorobenzene as the solvent, operated at 135° C. and flow rate of 1.0 ml/minute.
(2) Membrane thickness: Determined by a tracer type thickness meter (Mitsutoyo Litematic).
(3) Air permeability: Measured according to JIS P8117.
(4) Porosity: Determined by the weight method.
(5) Tensile strength: Breaking strength of the 10 mm wide specimen strip was determined according to ASTM D822.
(6) Average pore size: Determined by measuring sizes of 100 pores, selected from the transmission electron microgram of the porous membrane section, to find the average.
(7) Shut-down temperature: Determined by heating the membrane to a given temperature and measuring the temperature level at which its permeability increases to 100,000 seconds/100 cc or more.

Example 1

A polyethylene composition (melting point: 135° C., crystal dispersion temperature: 90° C.) having an Mw/Mn ratio of 14, composed of 20 weight % of an ultra-high-molecular-weight polyethylene (UHMWPE) having a weight-average molecular weight of $2.5 \times 10^6$ and 80 weight % of a high-density polyethylene (HDPE) having a weight-average molecular weight of 3.0×10⁵ was incorporated with 0.08 weight parts of a phenol-based antioxidant and 0.08 weight parts of phosphorus-based antioxidant, all based on 100 weight parts of the polyethylene composition, to prepare a polyethylene composition. Twenty (20) weight parts of the polyethylene composition was fed to a biaxial extruder (58 mm in diameter, L/D ratio=42, high kneading type segment), and 80 weight parts of liquid paraffin was also fed to the biaxial extruder from the side feeder, to prepare a polyethylene solution in the extruder by melting the polyethylene composition and kneading it with the liquid paraffin at 200° C. and 200 rpm. The resulting solution was extruded from the T-die attached at the extruder end at 190° C., and taken up by a cooling roll with a die-roll space of 20 mm, to prepare a gel-like sheet. The sheet was then biaxially stretched at 115° C. at an areal stretching ratio of 5 by 5, to prepare the stretched sheet. The resulting stretched membrane was washed with an excessive quantity of hexane to remove the residual liquid paraffin, and dried and heat-treated to prepare a microporous polyethylene membrane.

The resulting membrane was set on a 10 cm-square metallic frame, dipped in a liquid paraffin bath kept at 120° C. for 5 seconds, dipped in an excessive quantity of hexane bath to wash out the liquid paraffin, and dried at room temperature and then in an air oven at 115° C. for 2 minutes. The microporous polyolefin membrane thus prepared had a thickness of 32 μm, porosity of 67%, permeability of 65 seconds and tensile strength of 700 kgf/cm². The membrane section had the structure similar to that shown in FIG. 1 which presents the electron transmission microgram, and an average pore size of 8.2 μm in the vicinity of the one surface, 0.5 μm in the vicinity of the other surface, and 0.12 μm at near the center. The results are given in Table 1.

Example 2

A polyethylene composition (melting point: 135° C., crystal dispersion temperature: 90° C.) having an Mw/Mn ratio of 14, composed of 20 weight % of an ultra-high-molecular-weight polyethylene (UHMWPE) having a weight-average molecular weight of 2.5×10⁶ and 80 weight % of a high-density polyethylene (HDPE) having a weight-average molecular weight of 3.0×10⁵ was incorporated with 0.08 weight parts of a phenol-based antioxidant and 0.08 weight parts of phosphorus-based antioxidant, all based on 100 weight parts of the polyethylene composition, to prepare a polyethylene composition. Twenty (20) weight parts of the polyethylene composition was fed to a biaxial extruder (58 mm in diameter, L/D ratio=42, high kneading type segment), and 80 weight parts of liquid paraffin was also fed to the biaxial extruder from the side feeder, to prepare a polyethylene solution in the extruder by melting the polyethylene composition and kneading it with the liquid paraffin at 200° C. and 200 rpm. The resulting solution was extruded from the T-die attached at the extruder end at 190° C., and taken up by a cooling roll with a die-roll space of 20 mm, to prepare a gel-like sheet. The sheet was then biaxially stretched at 115° C. at an areal stretching ratio of 5 by 5, to prepare the stretched sheet. The resulting stretched membrane was washed with an excessive quantity of hexane to remove the residual liquid paraffin, and dried and heat-treated to prepare a microporous polyethylene membrane.

The resulting membrane was set on a 10 cm-square metallic frame, dipped in a liquid paraffin bath kept at 118° C. for 10 seconds, dipped in an excessive quantity of hexane bath to wash out the liquid paraffin, and dried at room temperature and then in an air oven at 115° C. for 2 minutes. The microporous polyolefin membrane thus prepared had a thickness of 30 μm, porosity of 58%, permeability of 200 seconds and tensile strength of 650 kg/cm². The membrane section had the structure similar to that shown in FIG. 1 which presents the electron transmission microgram, and an average pore size smaller at the membrane center than in the vicinity of the surface. The results are given in Table 1.

Comparative Example 1

Figure 2:
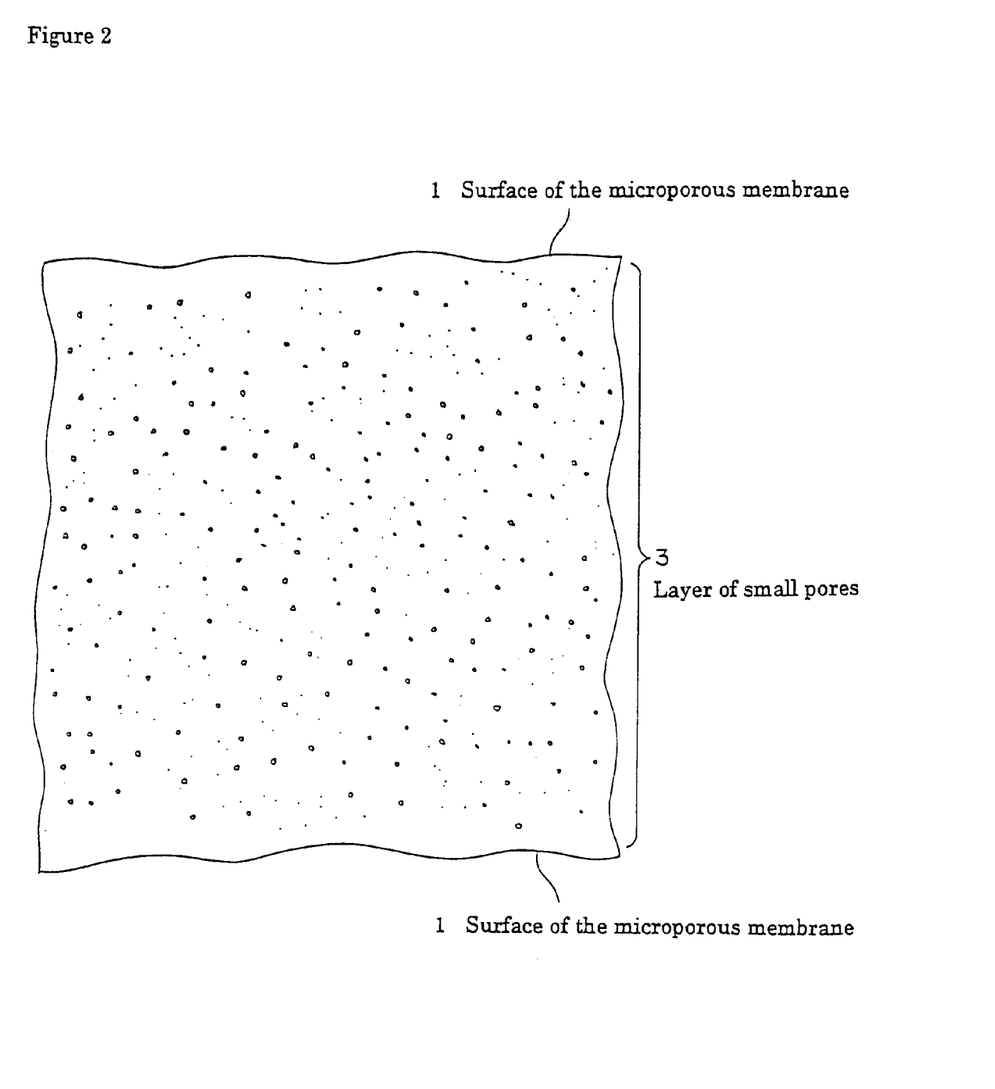
FIG. 2 presents the transmission electron microgram (magnification: 2,500) which shows the sectional structure of the microporous polyolefin membrane having pores of uniform size throughout the body of the membrane, corresponding to the one prepared in a COMPARATIVE EXAMPLE.

A microporous membrane was prepared in the same manner as in EXAMPLE 1 except that it was not treated with the hot solvent. The properties of the membrane are shown in Table 1. The microporous membrane surface and section had the structures similar to that shown in FIG. 2 which presents the electron transmission microgram, with uniform pore size throughout the membrane. It had a shut-down temperature of 135° C.

Comparative Example 2

The properties of a commercial microporous membrane, manufactured by Celgard, are shown in Table 1. The microporous membrane surface and section, observed by a scanning electron microscope and transmission electron microscope, respectively, had the structures with uniform pore size throughout the membrane.

TABLE 1

|  | Example 1 | Example 2 | Comparative Example 1 | Comparative Example 2 |
|---|---|---|---|---|
| Film forming conditions | | | | |
| Stretching conditions | | | | |
| Stretching ratio | 5 × 5 | 5 × 5 | 5 × 5 | manufactured by |
| Temperature (° C.) | 115 | 115 | 115 | Celgard |
| Conditions of treating with hot solvent | after making membrane | after stretching | — | — |
| Temperature (° C.) | 120 | 118 | — | — |
| Properties of microporous membranes | | | | |
| Thickness (μm) | 32 | 20 | 25 | 25 |
| Air permeability (sec/100 cc) | 65 | 200 | 650 | 550 |
| Porosity (%) | 67 | 58 | 41 | 40 |
| Tensile strength (kgf/cm²): TD | 700 | 650 | 805 | 460 |
| Average pore size [front surface - d/16] (mm) | 8.2 | 15.0 | 0.03 | 0.08 |

TABLE 1-continued

|  | Example 1 | Example 2 | Comparative Example 1 | Comparative Example 2 |
|---|---|---|---|---|
| Average pore size [back surface - d/16] (mm) | 0.5 | 9.5 | 0.03 | 0.08 |
| Average pore size [middle section] (mm) | 0.12 | 0.5 | 0.03 | 0.08 |

[Front surface - d/16]: Average pore size in the area from the one surface to a depth of d/16, wherein (d) is thickness of the membrane
[Back surface - d/16]: Average pore size in the area from the other surface to a depth of d/16, wherein (d) is thickness of the membrane (it should be noted that the [surface - d/16] is a positive number)
[Middle section]: Average pore size in the area other than the [front surface - d/16] and [back surface - d/16] areas.

Example 3

A polyethylene composition (melting point: 135° C., crystal dispersion temperature: 90° C.) having an Mw/Mn ratio of 14, composed of 20 weight % of an ultra-high-molecular-weight polyethylene (UHMWPE) having a weight-average molecular weight of $2.5 \times 10^6$ and 80 weight % of a high-density polyethylene (HDPE) having a weight-average molecular weight of $3.0 \times 10^5$ was incorporated with 0.08 weight parts of a phenol-based antioxidant and 0.08 weight parts of phosphorus-based antioxidant, all based on 100 weight parts of the polyethylene composition, to prepare a polyethylene composition. Twenty (20) weight parts of the polyethylene composition was fed to a biaxial extruder (58 mm in diameter, L/D ratio=42, high kneading type segment), and 80 weight parts of liquid paraffin was also fed to the biaxial extruder from the side feeder, to prepare a polyethylene solution in the extruder by melting the polyethylene composition and kneading it with the liquid paraffin at 200° C. and 200 rpm. The resulting solution was extruded from the T-die attached at the extruder end at 190° C., and taken up by a cooling roll with a die-roll space of 20 mm, to prepare a gel-like sheet. The sheet was then biaxially stretched at 115° C. at an areal stretching ratio of 5 by 5, to prepare the stretched sheet. The resulting stretched membrane was washed with an excessive quantity of hexane to remove the residual liquid paraffin, and dried and heat-treated to prepare a microporous polyethylene membrane.

The resulting membrane was dipped in a liquid paraffin bath kept at 118° C. for 10 seconds while it was held at both ends, dipped in an excessive quantity of hexane bath to wash out the liquid paraffin, and dried at room temperature and then in an air oven at 115° C. for 2 minutes. The microporous polyolefin membrane thus prepared had a thickness of 30 μm, porosity of 58%, permeability of 200 seconds and tensile strength of 650 kgf/cm² in the TD direction. Pore size in each layer, found by the scanning electron microgram for the surface and transmission electron microgram (FIG. 1) for the section, is given in Table 2.

Example 4

A polyethylene composition (melting point: 135° C., crystal dispersion temperature: 90° C.) having an Mw/Mn ratio of 14, composed of 20 weight % of an ultra-high-molecular-weight polyethylene (UHMWPE) having a weight-average molecular weight of $2.5 \times 10^6$ and 80 weight % of a high-density polyethylene (HDPE) having a weight-average molecular weight of $3.0 \times 10^5$ was incorporated with 0.08 weight parts of a phenol-based antioxidant and 0.08 weight parts of phosphorus-based antioxidant, all based on 100 weight parts of the polyethylene composition, to prepare a polyethylene composition. Twenty (20) weight parts of the polyethylene composition was fed to a biaxial extruder (58 mm in diameter, L/D ratio=42, high kneading type segment), and 80 weight parts of liquid paraffin was also fed to the biaxial extruder from the side feeder, to prepare a polyethylene solution in the extruder by melting the polyethylene composition and kneading it with the liquid paraffin at 200° C. and 200 rpm. The resulting solution was extruded from the T-die attached at the extruder end at 190° C., and taken up by a cooling roll with a die-roll space of 20 mm, to prepare a gel-like sheet. The sheet was then biaxially stretched at 115° C. at an areal stretching ratio of 5 by 5, to prepare the stretched sheet. The resulting stretched membrane was washed with an excessive quantity of hexane to remove the residual liquid paraffin, and dried and heat-treated to prepare a microporous polyethylene membrane.

The microporous membrane thus prepared had a thickness of 25 μm, porosity of 40%, permeability of 550 seconds and tensile strength of 805 kgf/cm² in the TD direction. The resulting membrane was set on a 10 cm-square metallic frame, onto which an excessive quantity of liquid paraffin was sprayed, brought into contact with a hot roll kept at 118° C. for 10 seconds, dipped in an excessive quantity of hexane bath to wash out the liquid paraffin, and dried at room temperature and then in an air oven at 115° C. for 2 minutes. The microporous polyolefin membrane thus prepared had a thickness of 30 μm, porosity of 55%, permeability of 200 seconds and tensile strength of 700 kgf/cm². Pore size in each layer, found by the scanning electron microgram for the surface and transmission electron microgram (FIG. 1) for the section, is given in Table 2.

Example 5

A microporous membrane was prepared in the same manner as in EXAMPLE 3 except that it was treated with the hot solvent at 122° C. for 10 seconds. The results are given in Table 2. As shown, pore size in the microporous membrane can be changed by changing treatment temperature and time with the hot solvent.

Example 6

A microporous membrane was prepared in the same manner as in EXAMPLE 3 except that it was treated with the hot solvent at 118° C. for 2 seconds. The results are given in Table 2.

Example 7

A polyethylene composition (melting point: 135° C., crystal dispersion temperature: 90° C.), composed of 20 weight % of an ultra-high-molecular-weight polyethylene (UHMWPE) having a weight-average molecular weight of $2.0 \times 10^6$, 66.7 weight % of a high-density polyethylene (HDPE) having a weight-average molecular weight of $3.9 \times 10^5$ and 13.3 weight % of a low-density polyethylene having a melt index of 2.0 (190° C., 2.16 kg) was incorporated with 0.375 weight parts of an antioxidant based on 100 weight parts of the polyethylene composition, to prepare a polyethylene composition. Fifteen (15) weight parts of the polyethylene composition was fed to a biaxial extruder (58 mm in diameter, L/D ratio=42, high kneading type), and 85 weight parts of liquid paraffin was also fed to the biaxial extruder from the side feeder, to prepare a polyethylene solution in the extruder by melting the polyethylene composition and kneading it with the liquid paraffin at 200° C. and 200 rpm. The resulting solution was extruded from the T-die attached at the extruder end in such a way to have 30 µm as thickness of the final product, and taken up by a cooling roll, kept at 50° C., to prepare a gel-like sheet. The sheet was then biaxially stretched at 115° C. at an areal stretching ratio of 5 by 5, to prepare the stretched sheet. The resulting membrane was set on a 10 cm-square metallic frame, dipped in a liquid paraffin bath kept at 115° C. for 10 seconds, dipped in an excessive quantity of hexane bath to wash out the liquid paraffin, and dried at room temperature and then in an air oven at 115° C. for 1 minute. Table 2 gives the thickness, porosity, permeability, tensile strength, and pore size in each layer of the resulting microporous polyethylene membrane.

Example 8

A polyethylene composition (melting point: 135° C., crystal dispersion temperature: 90° C.) composed of 20 weight % of an ultra-high-molecular-weight polyethylene (UHMWPE) having a weight-average molecular weight of $2.0 \times 10^6$ and 80 weight % of a high-density polyethylene (HDPE) having a weight-average molecular weight of $3.3 \times 10^5$ was incorporated with 0.375 weight parts of an antioxidant based on 100 weight parts of the polyethylene composition, to prepare a polyethylene composition. A mixture composed of 30 weight parts of the polyethylene composition and 5 weight parts of polyethylene wax (Mitsui Highwax-100, melting point: 115° C., molecular weight: 1,000, Mitsui Chemicals) was fed to a biaxial extruder (58 mm in diameter, L/D ratio=42, high kneading type), and 70 weight parts of liquid paraffin was also fed to the biaxial extruder from the side feeder, to prepare a polyethylene solution in the extruder by melting the polyethylene composition and kneading it with the liquid paraffin at 190° C. and 200 rpm. The resulting solution was extruded from the T-die attached at the extruder end in such a way to have 30 µm as thickness of the final product, and taken up by a cooling roll, kept at 50° C., to prepare a gel-like sheet. The sheet was then biaxially stretched at 115° C. at an areal stretching ratio of 5 by 5, to prepare the stretched sheet. The resulting membrane was set on a 10 cm-square metallic frame, dipped in a liquid paraffin bath kept at 115° C. for 10 seconds, dipped in an excessive quantity of hexane bath to wash out the liquid paraffin, and dried at room temperature and then in an air oven at 115° C. for 1 minute. Table 2 gives the thickness, porosity, permeability, tensile strength, and pore size in each layer of the resulting microporous polyethylene membrane.

Example 9

A polyethylene composition (melting point: 165° C., crystal dispersion temperature: 90° C.), composed of 20 weight % of an ultra-high-molecular-weight polyethylene (UHMWPE) having a weight-average molecular weight of $2.5 \times 10^6$, 60 weight % of a high-density polyethylene (HDPE) having a weight-average molecular weight of $3.5 \times 10^5$ and 20 weight % of a polyethylene having a weight-average molecular weight of $5.1 \times 10^5$ was incorporated with 0.375 weight parts of an antioxidant based on 100 weight parts of the polyethylene composition, to prepare a polyethylene composition. Thirty (30) weight parts of the polyethylene composition was fed to a biaxial extruder (58 mm in diameter, L/D ratio=42, high kneading type), and 70 weight parts of liquid paraffin was also fed to the biaxial extruder from the side feeder, to prepare a polyethylene solution in the extruder by melting the polyethylene composition and kneading it with the liquid paraffin at 200 rpm.

The resulting solution was extruded at 190° C. from the T-die attached at the extruder end, and taken up by a cooling roll to prepare a gel-like sheet. The sheet was then biaxially stretched at 115° C. at an areal stretching ratio of 5 by 5, to prepare the stretched sheet. The resulting membrane was set on a 10 cm-square metallic frame, dipped in a liquid paraffin bath kept at 115° C. for 10 seconds, dipped in an excessive quantity of hexane bath to wash out the liquid paraffin, and dried at room temperature and then in an air oven at 115° C. for 1 minute. Table 2 gives the thickness, porosity, permeability, tensile strength, and pore size in each layer of the resulting microporous polyethylene membrane.

Example 10

A polyethylene composition (melting point: 135° C., crystal dispersion temperature: 90° C.), composed of 17.6 weight % of an ultra-high-molecular-weight polyethylene (UHMWPE) having a weight-average molecular weight of $2.5 \times 10^6$, 70.8 weight % of a high-density polyethylene (HDPE) having a weight-average molecular weight of $3.3 \times 10^5$ and 11.6 weight % of an ethylene-a-olefin copolymer (density: 0.915, melting point: 108° C., ethylene-octene-1 copolymer, Affinity FM1570, the Dow Chemical) produced in the presence of a single-site catalyst was incorporated with 0.375 weight parts of an antioxidant based on 100 weight parts of the polyethylene composition, to prepare a polyethylene composition. Thirty (30) weight parts of the polyethylene composition was fed to a biaxial extruder (58 mm in diameter, L/D ratio=42, high kneading type), and 70 weight parts of liquid paraffin was also fed to the biaxial extruder from the side feeder, to prepare a polyethylene solution in the extruder by melting the polyethylene composition and kneading it with the liquid paraffin at 200 rpm.

The resulting solution was extruded at 190° C. from the T-die attached at the extruder end, and taken up by a cooling roll to prepare a gel-like sheet. The sheet was then biaxially stretched at 115° C. at an areal stretching ratio of 5 by 5, to prepare the stretched sheet. The resulting membrane was set on a 10 cm-square metallic frame, dipped in a liquid paraffin bath kept at 115° C. for 10 seconds, dipped in an excessive quantity of hexane bath to wash out the liquid paraffin, and dried at room temperature and then in an air oven at 115° C. for 1 minute. Table 2 gives the thickness, porosity, permeability, tensile strength, and pore size in each layer of the resulting microporous polyethylene membrane. Its shut-down temperature was measured at 105° C., indicating that it was improved in safety for a battery separator.

Example 11

A microporous membrane was prepared in the same manner as in EXAMPLE 4 except that it was not stretched and treated with the hot solvent at 118° C. for 2 seconds. Table 2 gives the thickness, porosity, permeability, tensile strength, and pore size in each layer of the resulting microporous polyethylene membrane.

Comparative Example 3

A microporous membrane was prepared in the same manner as in EXAMPLE 3 except that it was not treated with the hot solvent. Table 2 gives the thickness, porosity, permeability, tensile strength, and pore size in each layer of the resulting microporous polyethylene membrane.

Comparative Example 4

A microporous membrane was prepared in the same manner as in EXAMPLE 3 except that it was neither stretched nor treated with the hot solvent. Table 2 gives the thickness, porosity, permeability, tensile strength, and pore size in each layer of the resulting microporous polyethylene membrane.

TABLE 2

|  | Example | | | | | | | | | Comparative Example | |
| --- | --- | --- | --- | --- | --- | --- | --- | --- | --- | --- | --- |
|  | 3 | 4 | 5 | 6 | 7 | 8 | 9 | 10 | 11 | 3 | 4 |
| polyolefin composition | (A) | (A) | (A) | (A) | (B) | (C) | (D) | (E) | (A) | (A) | (A) |
| Stretching conditions | 5 × 5 | 5 × 5 | 5 × 5 | 5 × 5 | 5 × 5 | 5 × 5 | 5 × 5 | 5 × 5 | — | 5 × 5 | — |
| Stretching ratio | 115 | 115 | 115 | 115 | 115 | 115 | 115 | 115 | — | 115 | — |
| Temperature (° C.) |  |  |  |  |  |  |  |  | — | — | — |
| Thermal setting (before or after solvent removal) | before | after | before | before | before | before | before | before | before | — | — |
| Temperature (° C.) | 118 | 118 | 122 | 118 | 115 | 115 | 115 | 115 | 118 | — | — |
| Time (seconds) | 10 | 10 | 10 | 10 | 10 | 10 | 10 | 10 | 10 | — | — |
| Properties of microporous membranes |  |  |  |  |  |  |  |  |  |  |  |
| Thickness (μm) | 30 | 30 | 28 | 33 | 30 | 30 | 30 | 30 | 45 | 30 | 45 |
| Air permeability (sec/100 cc) | 200 | 200 | 36 | 150 | 102 | 114 | 61 | 78 | 13 | 550 | 28 |
| Porosity (%) | 58 | 55 | 76 | 50 | 59 | 61 | 66 | 65 | 82 | 40 | 72 |
| Tensile strength (kgf/cm$^2$): TD | 650 | 700 | 620 | 680 | 680 | 680 | 760 | 680 | 100 | 805 | 160 |
| Average pore size [front surface - d/16] (mm) | 15.0 | 8.2 | 15.0 | 15.0 | 12.8 | 11.2 | 15.0 | 12.3 | 16.2 | 0.03 | 0.21 |
| Average pore size [back surface - d/16] (mm) | 9.5 | 0.5 | 14.8 | 9.5 | 8.7 | 8.8 | 7.5 | 9.3 | 9.3 | 0.03 | 0.18 |
| Average pore size [middle section] (mm) | 0.5 | 0.12 | 14.8 | 0.35 | 0.47 | 0.48 | 0.5 | 0.5 | 0.20 | 0.03 | 0.18 | polyolefin composition;

(A): 2.5 × 10$^6$ UHMWPE(30 wt. %)/6.8 × 10$^5$ HDPE(70 wt. %)

(B): 2.5 × 10$^6$ UHMWPE(20 wt. %)/3.9 × 10$^5$ HDPE(66.7 wt. %)/LDPE(13.3 wt. %)

(C): 2.5 × 10$^6$ UHMWPE(19 wt. %)/3.3 × 10$^5$ HDPE(76 wt. %)/PE Wax(5 wt. %)

(D): 2.5 × 10$^6$ UHMWPE(20 wt. %)/3.3 × 10$^5$ HDPE(60 wt. %)/PP(20 wt. %)

(E): 2.5 × 10$^6$ UHMWPE(17.6 wt. %)/3.3 × 10$^5$ HDPE(70.8 wt. %)/ethylene-octene-1 copolymer(11.6 wt. %)

[Front surface - d/16]: Average pore size in the area from the one surface to a depth of d/16, wherein (d) is thickness of the membrane

[Back surface - d/16]: Average pore size in the area from the other surface to a depth of d/16, wherein (d) is thickness of the membrane (it should be noted that the [surface - d/16] is a positive number)

[Middle section]: Average pore size in the area other than the [front surface - d/16] and [back surface - d/16] areas.

As described in detail, the microporous polyolefin membrane of the present invention is a highly permeable microporous membrane having a novel structure with the larger pores in the vicinity of at least one membrane surface and smaller pores inside in the thickness direction, the pore size decreasing in the thickness direction. This structure makes the membrane suitable for various devices, e.g., battery separators and liquid filters. The production method of the present invention is also effective in that it gives the microporous membrane having a structure with large pores inside in the thickness direction, without changing the production process.

What is claimed is:

1. A method of producing a microporous polyolefin membrane, comprising the steps of extruding a solution composed of 10 to 50 weight % of (A) a polyolefin having a weight-average molecular weight of $5 \times 10^5$ or more or (B) a composition containing this polyolefin and 50 to 90 weight % of a solvent, into a gel-like formed article and removing the solvent therefrom, wherein a treatment step with a hot solvent is performed on the gel-like formed article, and wherein the average pore size (a) in the area from the surface to a depth of d/16 (d: thickness of said membrane) is 0.05 to 50 μm, and the average pore size (b) in the other area is 0.01 to 30 μm, where the relationship (b)<(a) holds.

2. The method of producing a microporous polyolefin membrane according to claim 1, wherein the average pore size (a) in the area from the surface to a depth of d/16 (d: thickness of said membrane) is 1 to 30 μm, and the average pore size (b) in the other area is 0.003 to 2 μm.

* * * * *